S. B. Minnich.
Manure Fork.
N° 63650      Patented Apr. 9, 1867.

Witnesses.
Walter G. Evans
Jacob Stauffer

Inventor.
Simon B. Minnich

United States Patent Office.

SIMON B. MINNICH, OF LANDISVILLE, PENNSYLVANIA, ASSIGNOR TO HIMSELF AND H. K. BURKHOLDER, OF LANCASTER COUNTY.

Letters Patent No. 63,650, dated April 9, 1867.

IMPROVEMENT IN STOP-JOINTED MANURE DRAG.

*The Schedule referred to in these Letters Patent and making part of the same.*

TO ALL WHOM IT MAY CONCERN:

Be it known that I, SIMON B. MINNICH, of Landisville, in the county of Lancaster, and State of Pennsylvania, have invented a new and improved Stop-Jointed Manure Drag or Hook; and I do hereby declare that the following is a full and exact description thereof, reference being had to the accompanying drawings, making a part of this specification, in which—

Figure 1:
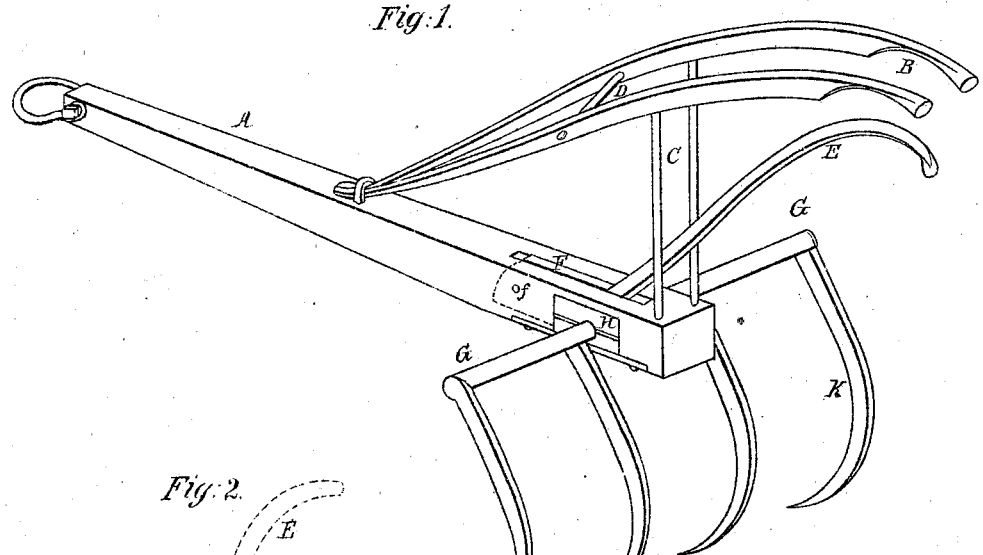

Figure 1 is a perspective view of the entire implement.

Figure 2:
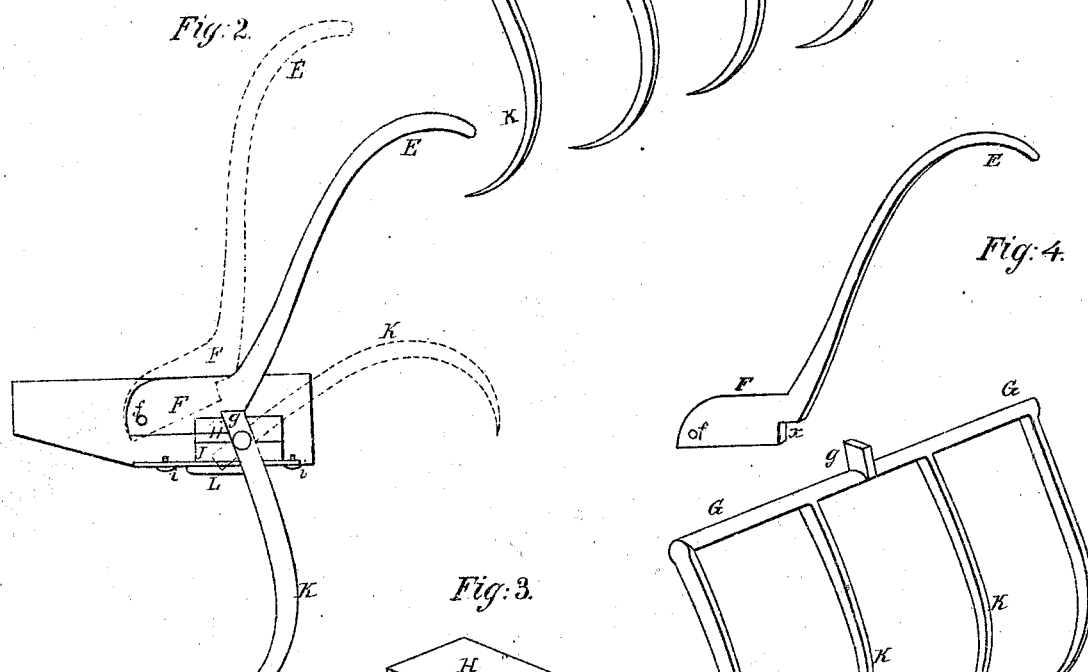

Figure 2 to illustrate the action of the lever and lug on the shaft of the united hooks or prongs.

Figure 3:
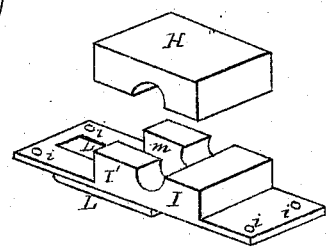

Figure 3, a perspective view of the boxes for the said shaft or top of the prongs.

Figure 4:
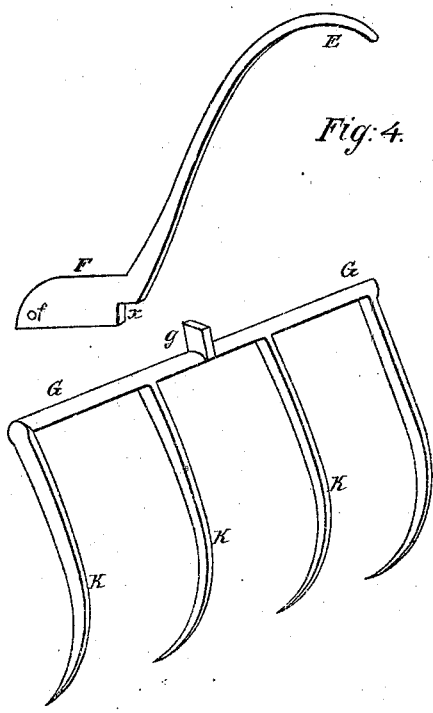

Figure 4 shows the lever with its stop notch $x$, and the four-pronged hook with its central lug or stop projection $g$.

The nature of my invention is in providing a manure drag or hook to be drawn by a horse, and that will firmly grasp and hold a large quantity, and capable of being discharged and reset in the most simple and efficient manner.

To enable others skilled in the art to make and use my invention, I will proceed to describe its construction and operation.

I construct my drag of a single beam, A, with a clevis in front for attaching a horse, or a handle if for human power, (on a smaller scale.) This beam is provided with handles B, similar to those on a plough, braced by D, and supported by rods C. Near the end of the beam there is a slot, into which the heel F of the lever E is inserted and held by a pivot, $f$. The combined box H I is inserted into the under side of the beam. In this box the horizontal round shaft G of the hooks K has its support and motion. Fig. 4 shows the lever E with its heel F, and stop notch $x$ and pivot $f$, also the hook with its four prongs K, and round shaft G, and lug or stop $g$, on the centre of said shaft G. Fig. 3 shows the upper portion of the box H, and the lower portion I I'; the side I' with a central opening, $m$, and pocket L, to allow the lug $g$ to enter when the prongs K on their shaft G are thrown up, in order to discharge their contents. This lower portion I I' is secured by bolts through the holes $i$.

The operation is simple, and illustrated by fig. 2. The blue lever and hook K attached to the shaft G, (shown in profile,) with the lug or stop $g$ resting squarely against the notch $x$, in the heel F of the lever E. This keeps the hook or drag vertical for grasping and dragging out the manure in a firm position. When arrived at the place of destination by raising the lever, as shown by the red color, the notch $x$ and stop or lug $g$ become disengaged and the hooks and their shaft are turned up as shown, the lug $g$ passing through the slots $m$ in the box I' and H into the pocket L, and the manure is dislodged in its place, when the drag is left in that position and drawn back for a fresh load. In order to reset the machine it is only necessary to raise it up by the handles B, (a single handle might answer,) when the hook will swing forward by its own gravity, and the lever in like manner drops down, embracing or propping the lug $g$ by its notch $x$, as before, so that the swinging forward of the hook arrested by the notch is sunk into the manure for being dragged out, without any effort further than raising the machine. The ease and facility with which a large stable is speedily cleansed recommend this implement to every farmer. To say the least it is truly useful, and believed to be as novel in the revolving shaft, stop, and lever arrangement. I am aware that horse-hooks, both for hoisting hay and manuring stables are not new, but I lay no claims to a hay-hook. My invention is designed for the purpose set forth and for no other.

What I claim as my invention, and desire to secure by Letters Patent, is—

The arrangement of the notched lever E F $x$, with the stop $g$ on the jointed hook G K, in combination with the box H I', constructed and operating in the manner specified for the purpose set forth.

SIMON B. MINNICH.

Witnesses at signing:
WALTER G. EVANS,
JACOB STAUFFER.